United States Patent [19]

Nelson et al.

[11] Patent Number: 5,436,857

[45] Date of Patent: Jul. 25, 1995

[54] PERSONAL COMPUTER MODULE SYSTEM AND METHOD OF USING

[75] Inventors: Richard Nelson, Butte, Mont.; Frank Liebenow, Greer, S.C.

[73] Assignee: NCR Corporation, Dayton, Ohio

[21] Appl. No.: 157,247

[22] Filed: Nov. 22, 1993

[51] Int. Cl.[6] ........................ G06F 1/00; G06F 3/00
[52] U.S. Cl. ........................... 364/708.1; 364/709.1
[58] Field of Search ........... 364/705.06, 708.1, 709.01, 364/709.02, 709.07–709.11

[56] References Cited

U.S. PATENT DOCUMENTS

| | | | |
|---|---|---|---|
| 4,002,892 | 1/1977 | Zielenski | 364/708.1 |
| 4,143,417 | 3/1979 | Wald et al. | 360/55 |
| 4,361,877 | 11/1982 | Dyer et al. | 364/464.04 |
| 4,523,297 | 6/1985 | Ugon et al. | 364/709.1 |
| 4,683,550 | 7/1987 | Jindrick et al. | 364/709.1 |
| 4,769,764 | 9/1988 | Levanon | 364/708.1 |
| 4,890,832 | 1/1990 | Komaki | 273/460 |
| 5,126,954 | 6/1992 | Morita | 364/708.1 |

*Primary Examiner*—Roy N. Envall, Jr.
*Assistant Examiner*—Emmanuel L. Moise
*Attorney, Agent, or Firm*—Albert L. Sessler, Jr.

[57] ABSTRACT

A computer system includes a processor/memory/disk module which is selectively mated with any one of a number of associated computer base units, such as a portable PC base unit and a desktop PC base unit. The processor/memory/disk module incorporates essential elements, including a processor, a disk and a memory, of the components required for operation of a computer. The processor/memory/disk module is readily removable from a base unit so as selectively to be coupled to any desired base unit for operation of that base unit, or to be removed and put away for security purposes.

12 Claims, 2 Drawing Sheets

PERSONAL COMPUTER MODULE SYSTEM AND METHOD OF USING

BACKGROUND OF THE INVENTION

The present invention relates to a personal computer module system and method of using and more particularly relates to such a system and method in which two environments, namely desktop and portable, are provided for a common processor and memory module.

In the field of personal computers (PCs), there are two broad categories, namely portable PCs and desktop PCs. Each of these categories has certain advantages over the other. For example, the portable PC has the advantages that it can be taken with the user on business trips, can be used in areas where standard household current is not available, and is relatively small and light in weight. On the other hand, the desktop PC is not dependent on a battery having a limited life, normally has a larger display, has an easier-to-use keyboard and "mouse", can be permanently connected to a network which includes a printer and other desirable peripheral units, and may have higher capabilities in terms of such things as memory, processing power, etc.

In the past, there have been attempts to combine the functions of portable PCs with those of desktop PCs. These have generally been docking station or cable management concepts which usually lead to clumsy and expensive interconnections and wasted desk space.

There is accordingly a need for a system which provides the advantages of both portable PCs and desktop PCs without the attendant disadvantages of increased cost and wasted desk space.

SUMMARY OF THE INVENTION

The computer system of the present invention provides a plurality of environments, including for example desktop and portable, for a common processor, hard drive and memory module. The user simply plugs the processor, hard drive and memory module into either a portable PC base unit or a desktop PC base unit, enabling operation of the combined units as a complete data processing system. The module is readily removable to be plugged into another base unit or to be carried elsewhere or to be put away in a secure area.

It is accordingly an object of the present invention to provide a detachable processor, hard drive and memory module which can be combined with one of several types of base units to provide a plurality of different types of PC capabilities.

Another object is to provide a computer system having both desktop and portable capabilities employing a detachable processor, hard drive and memory module.

Another object is to provide a computer system comprising a processor, hard drive and memory module, a desktop PC base unit and a portable PC base unit.

Another object is to provide a method for supplying data processing capability selectively in either a stationary data processing device or a portable data processing device using a common module.

Additional benefits and advantages of the present invention will become apparent to those skilled in the art to which this invention relates from the subsequent description of the preferred embodiment and the appended claims, taken in conjunction with the accompanying drawings.

DETAILED DESCRIPTION

Figure 1:
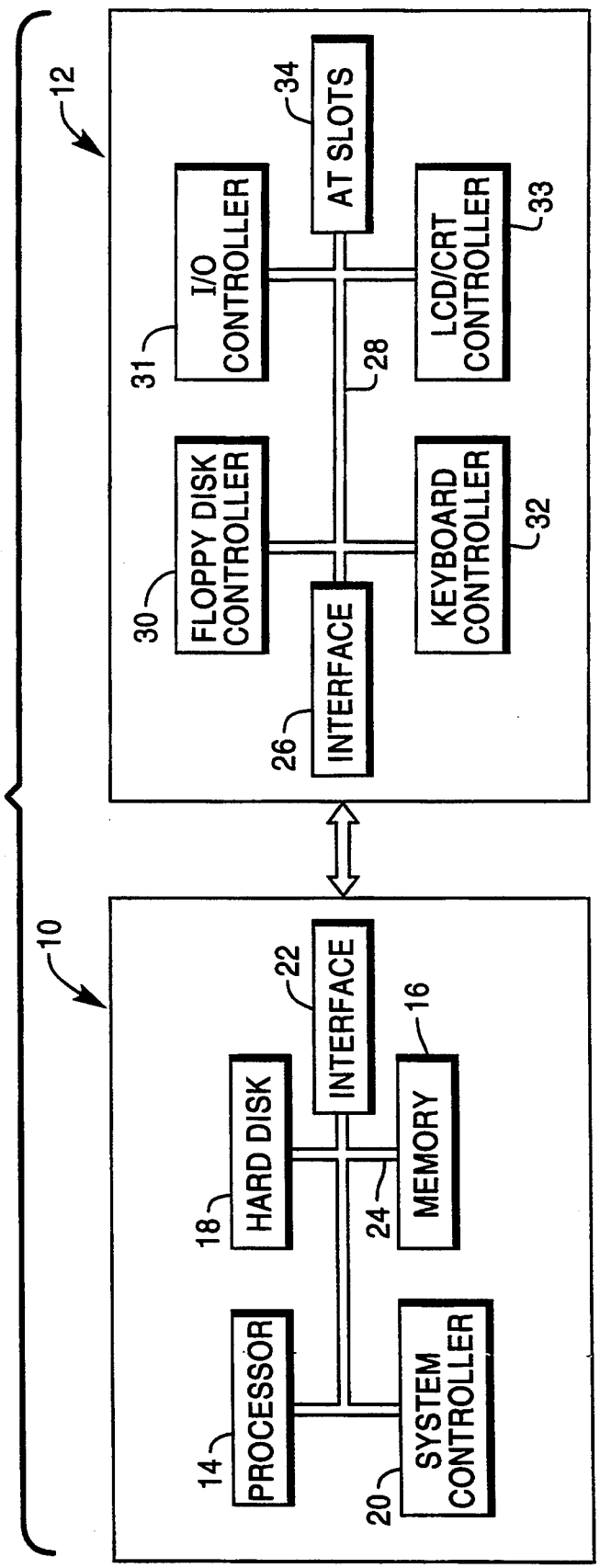
FIG. 1 is a block diagram of a processor, hard drive and memory module and an associated PC base unit.

Shown in FIG. 1 is a block diagram of a computer system, such as a personal computer, for example, which comprises a module 10 and a base unit 12. The module 10 contains a subset of the main computing power of a PC that can be used in many different environments. The base unit 12 can take many different forms. For example, it can comprise a portable PC or a desktop PC. It will be noted that the customary functional components of a PC are divided between the module 10 and the base unit 12. One suitable arrangement is for the module 10 to include a processor 14, a memory 16, a hard disk unit 18 and a system controller 20. In addition, the module 10 contains an interface 22 to enable the module 10 to be coupled to the base unit 12, and a bus 24 for interconnecting the other components 14, 16, 18, 20 and 22 of the module 10. The module is packaged in a case which provides mechanical modularity which enables it to be installed and optionally locked into a host device which may be, for example, a portable PC or a desktop PC.

The base unit 12 includes an interface 26 which engages the interface 22 of the module 10 to couple the module 10 to the base unit 12. A bus 28 in the base unit 12 is coupled to the interface 26 and is also coupled to the other components of the base unit 12, which may include a floppy disk controller 30, an I/O controller 31, a keyboard controller 32, an LCD/CRT controller 33 and a plurality of slots 34 which enable the addition of other desired components to the base unit 12, such as various peripherals, expanded memory, etc., in a manner which is well-known. It will be recognized that the specific elements included in the module 10 and the base unit 12 shown in FIG. 1 are shown for illustrative purposes only, and that different components could be included in the module 10 and the base unit 12, if desired.

Figure 2:
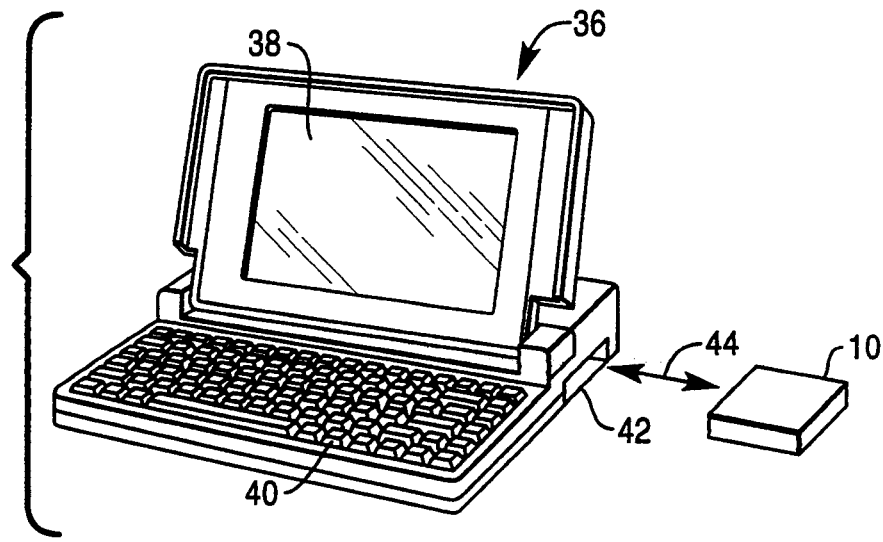
FIG. 2 is a perspective view showing a portable PC base unit and an associated processor, hard drive and memory module positioned to be placed in a receptacle of said portable PC base unit.

FIG. 2 illustrates one way in which the module 10 can be removably inserted into a portable PC 36 which includes electronic components comprising the base unit 12. The portable PC 36 includes such standard features as a display 38 and a keyboard 40 and also includes a receptacle 42 which is appropriately configured to receive the module 10. As represented by the double-headed arrow 44 in FIG. 2, the module 10 may readily be moved into and out of the housing of the portable PC 36, with the interface 22 of the module 10 moving into and out of operative coupling with the interface 26 of the base unit 12 which is included in the portable PC 36.

Figure 3:
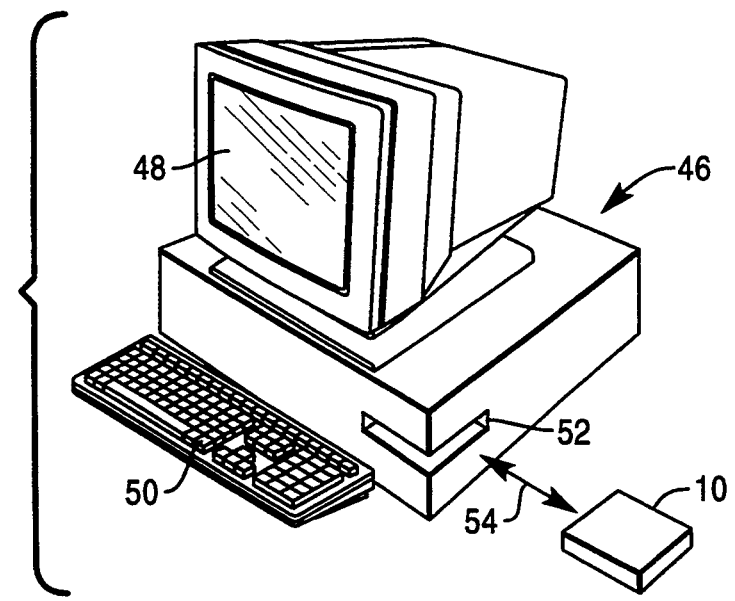
FIG. 3 is a perspective view showing a desktop PC base unit and an associated processor, hard drive and memory module positioned to be placed in a receptacle of said desktop PC base unit.

FIG. 3 is similar to FIG. 2 and illustrates one way in which the module 10 can be inserted into a desktop PC 46 which includes electronic components comprising the base unit 12. The desktop PC includes such standard features as a monitor 48 and a keyboard 50 and also includes a receptacle 52 which is appropriately configured to receive the module 10. As represented by the double-headed arrow 54 in FIG. 3, the module 10 may readily be moved into and out of the housing of the desktop PC 46, with the interface 22 of the module 10 moving into and out of operative coupling with the interface of the base unit 12 which is included in the desktop PC 46.

The system of the present invention offers a number of advantages over other systems currently on the market. The cost of this system is lower than systems with duplicated CPU, memory and processing. Separate desktop and portable systems can each be tailored for optimal human interface, whereas other systems that attempt to combine these two types compromise display and keyboard location. The portability of the module 10 provides added security, since the module can be locked up or carried on the person of the user. For large business establishments, a system solution can be provided that offers desktop PCs for each employee plus a number of portable PCs that can be used for travelling or for work at home, with the employee being able to transfer the module 10 from one PC to the other, which is attractive from a cost and convenience standpoint. Finally, the system provides an elegant modular path for upgrades of elements such as the processor, the hard disk unit, etc.

Although the invention has been described with particular reference to a preferred embodiment thereof, variations and modifications of the present invention can be effected within the spirit and scope of the following claims.

What is claimed is:

1. A data processing system, comprising:
   a first data processing base unit included in a first computer designed for portable use and having a receptacle for receiving a data processing module;
   a second data processing base unit included in a second computer designed for stationary use and having a receptacle for receiving said data processing module; and
   a data processing module which can be placed in the receptacle of either the first or the second computer and operatively engaged with the base unit of that computer to provide an operable data processing device.

2. The system of claim 1, in which the base unit of each computer includes a keyboard controller, a floppy disk controller, an interface for connection to the data processing module and a bus coupling said keyboard controller, said floppy disk controller and said interface.

3. The system of claim 2, in which said base unit of each computer also includes an I/O controller and an LCD/CRT controller coupled to said bus.

4. The system of claim 1, in which said data processing module includes a processor and a memory.

5. The system of claim 1, in which said data processing module includes a processor, a memory, a controller, a hard disk unit, an interface for connection to a base unit and a bus coupling said processor, said memory, said controller, said hard disk unit and said interface.

6. The system of claim 1, in which the first computer comprises a portable PC.

7. The system of claim 1, in which the second computer comprises a desktop PC.

8. A method for supplying data processing capability selectively to different types of data processing devices using a common module, comprising the following steps:
   (a) providing a first type of data processor base unit having some, but not all, of the functions necessary to perform data processing operations;
   (b) providing a second type of data processor base unit having some, but not all, of the functions necessary to perform data processing operations;
   (c) providing a detachable data processing module having the remaining functions necessary to enable either the first or second type of data processor base unit to perform data processing operations; and
   (d) selectively coupling the detachable data processing module to either the first or the second type of data processor base unit.

9. The method of claim 8, in which the first type of data processor is a portable PC.

10. The method of claim 8, in which the first type of data processor is a desktop PC.

11. The method of claim 8, in which the first type of data processor is a portable PC and the second type of data processor is a desktop PC.

12. The method of claim 8, in which at least one of the first and second types of data processing base units comprises a keyboard controller, a floppy disk controller, an I/O controller, an LCD/CRT controller, an interface and a bus coupling these elements, in which the detachable data processing module comprises a processor, a memory, a controller, a hard disk unit, an interface and a bus coupling these elements, and in which the step of selective coupling comprises coupling the two interfaces to provide a data processing system which comprises a coupled keyboard controller, floppy disk controller, processor, memory, controller and hard disk unit.

* * * * *